United States Patent [19]

Furuishi et al.

[11] 4,021,717
[45] May 3, 1977

[54] CHARGING SYSTEM

[75] Inventors: Haruhisa Furuishi, Suita; Katsuaki Kawamoto, Katano; Yoneji Koyama, Hirakata, all of Japan

[73] Assignee: Matsushita Electric Industrial Co., Ltd., Osaka, Japan

[22] Filed: Mar. 17, 1975

[21] Appl. No.: 559,214

Related U.S. Application Data

[63] Continuation of Ser. No. 434,287, Jan. 17, 1974, abandoned.

[30] Foreign Application Priority Data

May 16, 1973  Japan .............................. 48-54966
May 16, 1973  Japan .............................. 48-54967
Dec. 5, 1973  Japan ............................ 48-137571

[52] U.S. Cl. .................................. 320/39; 321/2; 321/18; 320/21; 320/23
[51] Int. Cl.² ...................... H02J 7/00; H02M 3/22

[58] Field of Search ............... 321/2, 18; 320/2, 54, 320/56, 39, 40, 21–24

[56] References Cited
UNITED STATES PATENTS

| | | |
|---|---|---|
| 3,443,195 | 5/1969 | Hoffman, Jr. et al. ........ 320/39 UX |
| 3,510,746 | 5/1970 | Furuishi et al. ..................... 320/39 |
| 3,673,485 | 6/1972 | Vital et al. .............................. 320/2 |
| 3,701,937 | 10/1972 | Combs .................................. 321/2 |

Primary Examiner—Robert J. Hickey
Attorney, Agent, or Firm—Stevens, Davis, Miller & Mosher

[57] ABSTRACT

There is provided a charging system for secondary batteries comprising a high-frequency power supply circuit consisting of a transistor DC-DC converter and a control circuit for preventing the overcharging of a battery to be charged, whereby the oscillation of the high-frequency power supply circuit is controlled by the control circuit. Thus, the size and weight of the charging system of this invention are reduced.

2 Claims, 9 Drawing Figures

CHARGING SYSTEM

This is a continuation of application Ser. No. 434,287, filed Jan. 17, 1974, now abandoned.

The present invention relates to a charging system for secondary batteries and more particularly to a charging system which comprises a high-frequency power supply circuit and a control circuit for preventing the overcharging of a battery and which is small and light.

Battery charging systems are known in the art in which the power supply comprises a commercial AC power supply and which employ a low-frequency transformer having an insulation provided on each of the primary and secondary sides thereof. In such systems, a control for battery charging is effected on the secondary side and there is thus no need for any special insulation means for this purpose. However, to reduce the size and weight of a charging system and to reduce the manufacturing costs thereof, it has been found that from the standpoint of reducing the size, weight and manufacturing costs of the charging system, it is more meritorious to effect the required current control on the primary side of a high-frequency converter rather than effecting the current control on the transformer secondary side by means of a large current control element. In this case, the provision of a feedback circuit for sensing an overcharge state on the secondary side and providing a feedback to the primary side requires that a control circuit including the necessary insulation means for the primary and secondary sides must be provided from the standpoint of safety.

It is an object of the present invention to provide a charging system which meets the foregoing requirements.

It is another object of the present invention to provide a charging system equipped with a charge indicating circuit.

In accordance with the present invention, there is thus provided a charging system comprising a charging power supply consisting of a transistor DC-DC converter that oscillates at a high frequency to charge a battery, and a voltage switch circuit for stopping the charging when the battery has been charged to an overcharge voltage, wherein the termination of the charging is accomplished by short-circuiting a circuit transistor between the emitter and the base thereof, thereby providing a compact power supply of large current capacity and positively preventing overcharging of a battery.

Further, while, in the above-mentioned exemplary embodiment of this invention, provision is made to prevent the primary side line voltage from being applied to the secondary side from the standpoint of safety, the insulation for a required withstand voltage for the primary and secondary sides of the charging system is still inadequate. This problem of the insulation and withstand voltage is overcome by the charging system according to another form of this invention in which a photo coupler comprising a light emitting element and a photoelectric converter is employed so that it functions as insulating means when a signal is fed back from the secondary side of the primary side of the system.

Other objects, features and advantages will become readily apparent from the following detailed description taken in conjunction with the accompanying drawings, in which.

The present invention will now be described in greater detail with reference to the illustrated embodiments.

Figure 1:
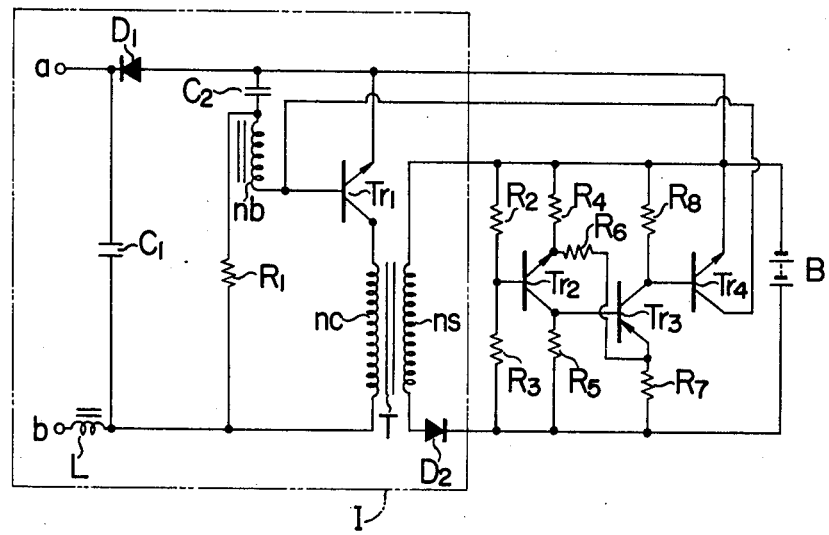
FIG. 1 is a circuit diagram of a high-frequency DC-DC converter type charging system including an overcharging preventive charging control circuit according to an embodiment of the invention.

Referring first to FIG. 1 showing a first embodiment, enclosed by a dotted line and designated by numeral I is a high-frequency power supply circuit for producing the required high frequency from the commercial AC power supply through blocking oscillations. In the high-frequency power supply circuit I, an inductance L and a capacitor $C_1$ consitute a noise absorbing circuit on the commercial AC power supply side. Symbols $D_1$ and $D_2$ designate rectifier diodes, $C_2$ a capacitor, $R_1$ a resistor, $T_{r1}$ a circuit transistor, T an oscillatory transformer having a collector winding $nc$, base winding $nb$ and secondary winding $ns$. On the secondary side of the transformer T, symbol B designates a secondary battery to be charged (hereinafter referred to as a battery) which is connected to the output of the power supply circuit I, $R_2$ and $R_3$ voltage dividing resistors connected in parallel with the battery B, $T_{r2}$ an NPN transistor whose base is connected to the midpoint of the voltage dividing resistors $R_2$ and $R_3$, emitter is connected to the negative terminal of the battery B through a resistor $R_4$ and collector is connected to the positive terminal of the batter B through a resistor $R_5$ and to the base of a PNP transistor $T_{r3}$. The emitter of the transistor $T_{r3}$ is connected to the emitter of the transistor $T_{r2}$ through a resistor $R_6$ and to the positive terminal of the battery B through a resistor $R_7$. The collector of the transistor $T_{r3}$ is connected to the negative terminal of the battery B through a resistor $R_8$ so that a voltage switch is constituted by a jumping amplifier circuit. The output terminal of this voltage switch or the collector of the transistor $T_{r3}$ is connected to the base of a transistor $T_{r4}$ whose emitter is connected to the negative terminal of the battery B and to the emitter of the circuit transistor $T_{r1}$. The collector of the transistor $T_{r4}$ is connected to the base of the circuit transistor $T_{r1}$.

With the construction described above, the automatic charging system according to the first embodiment operates as follows. When the commercial AC power is applied across input terminals $a$ and $b$ of the high-frequency power supply circuit I, it is triggered into oscillation at a high frequency. The output produced through the transformer T is the DC voltage rectified by the diode $D_2$ and the battery B is charged with this DC voltage. When the battery B is charged to an overcharge voltage, the transistor $T_{r2}$ is turned on by the operating voltage determined by the dividing values of the resistors $R_2$ and $R_3$. Therefore, the transistors $T_{r3}$ and $T_{r4}$ are also turned on with the result that the transistor $T_{r1}$ is short-circuited between the base and the emitter thereof by the transistor $T_{r4}$ to stop the oscillation of the transistor $T_{r1}$. Consequently, there is no longer any induced voltage in the secondary winding of the transformer T and the charging of the battery B is terminated.

It will thus be seen from the forgoing description that the system according to this embodiment has, by virtue of the use of a power supply operated at a higher frequency, the following advantages over the conventional charging systems employing a low-frequency power supply circuit. Since it is possible to reduce the size of the charging power supply with the use of a smaller inductance or capacitor and since it can be readily designed as a charging power supply having a large current capacity, this system is useful as a quick charging power supply. Further, since the circuit transistor $T_{r1}$ in the high-frequency power supply circuit I is short-circuited between the emitter and the base thereof when the battery B is charged to an overcharge voltage so that the transistor $T_{r1}$ can be fully turned off and the transistor breakdown voltage is dependent on the collector-base voltage $V_{CB}$, the transistor is not required to be of a high quality if the $V_{CB}$ is maintained at a high value.

Figure 2:
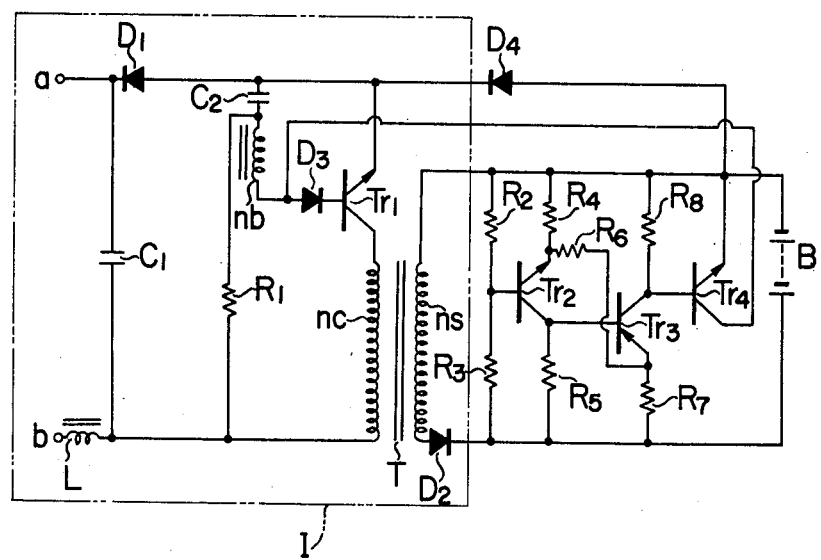
FIG. 2 is a circuit diagram of the charging system according to another embodiment of this invention employing a modified form of the circuitry shown in FIG. 1.

In FIG. 2, there is illustrated a circuit diagram of a second embodiment of the charging system of this invention wherein the circuitry is particularly constructed from the standpoint of safety, e.g., from the standpoint of making the primary and secondary sides of the transformer T electric shock proof. The second embodiment is identical with the embodiment of FIG. 1 excepting that a diode $D_4$ is connected between the emitters of the transistors $T_{r1}$ and $T_{r4}$ in a direction that permits a flow of current from the transistor $T_{r4}$ to the transistor $T_{r1}$ and that a diode $D_3$ is connected to the junction point between the base of the transistor $T_{r1}$ and the collector of the transistor $T_{r4}$.

The purpose of the diode $D_4$ is to prevent the high voltage of the commercial power supply in the transformer primary from being applied to the transformer secondary and giving rise to a trouble such as an electric shock. The diode $D_3$ is provided so that the transistor $T_{r1}$ is fully turned off when the battery B is in an overcharge condition and the transistor $T_{r4}$ is turned on. In this case, the same effect may be obtained by connecting the diode $D_3$ to the emitter of the transistor $T_{r1}$ and not to the base thereof.

Figure 3:
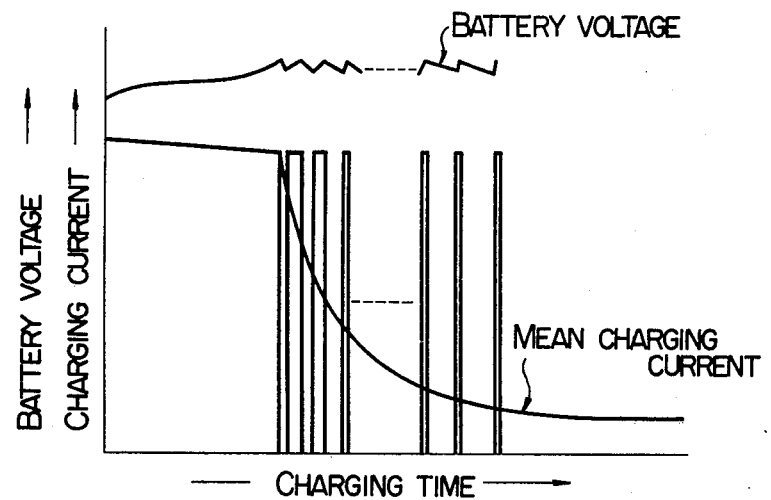
FIG. 3 is a charging characteristic diagram of the charging systems shown in FIGS. 1 and 2.

FIG. 3 shows a charging characteristic diagram of the embodiments shown in FIGS. 1 and 2. During the initial charging period, the voltage switch is off and the charging current flows continuously. Upon reaching an overcharge voltage, the oscillation is stopped to temporarily stop the charging current. The voltage switch used in the embodiments exhibits an on-off hysteresis effect owing to a backlash effect peculiar to the transistor switching operation and there is a relationship "turn-on voltage < turn-off voltage" between the two voltages. Consequently, following the termination of the charging current, the voltage of the battery B drops to the turn-on voltage due to its self-discharging and so on and thus the charging condition is reestablished to cause a flow of pulse-like charging current as shown in FIG. 3. The relationship between the battery charging period and the charging interruption period is as shown in FIG. 3 so that the mean charging current drops to a value low enough to eliminate the danger of overcharging the battery and in this way the overcharging of the battery is automatically prevented.

Figure 4:
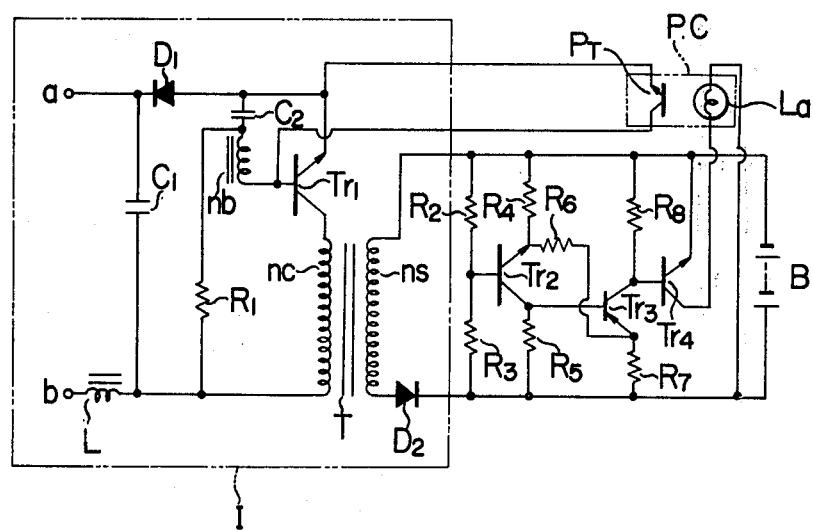
FIG. 4 is a circuit diagram of the charging system according to still another embodiment of the invention in which a photo coupler functions to provide insulation between the primary and secondary sides of the DC-DC converter and performs on-off control of the oscillatory transistor in the DC-DC converter.

While, in the embodiments of this invention described so far with reference to FIGS. 1 and 2, the insulation between the primary and secondary sides of the system and the voltage proof therefor are not completely satisfactory, the third embodiment shown in FIG. 4 shows an arrangement designed to provide an improved insulation and withstand voltage.

In the charging system of FIG. 4 wherein consideration is given to the insulation of the primary and secondary sides of the system, the construction of the high-frequency power supply circuit I on the primary side and the constructions of the battery B and the voltage switch connected thereto on the secondary side are identical with those of the embodiment of FIG. 1. Therefore, only the difference between the two embodiments will be described.

In FIG. 4, the emitter of the output stage transistor $T_{r4}$ in the voltage switch comprising the resistors $R_2$ through $R_8$ and the transistors $T_{r2}$ through $T_{r4}$, is connected to the negative terminal of the battery B and a light emitting element $L_a$ is connected between the collector of the transistor $T_{r4}$ and the positive terminal of the battery B. A photo-electric conversion element $P_T$ (e.g., photo transistor) operable in association with the light emitting element $L_a$ is provided so that its emitter electrode is connected to the emitter of the primary side circuit transistor $T_{r1}$ and its collector electrode is connected to the base of the transistor $T_{r1}$. The light emitting element $L_a$ and the photoelectric conversion element $P_T$ are combined in a single photo coupler PC so that the photoelectric conversion element $P_T$ is operated in association with the light emitting element $L_a$. The flashing operation of the light emitting element $L_a$ is dependent on the operation of the voltage switch for detecting the overcharge voltage of the battery B. In other words when the overcharge voltage is attained, the voltage switch is turned on and simultaneously the light emitting element $L_a$ is operated to apply a light signal to the photoelectric conversion element $P_T$. Consequently, the photoelectric conversion element $P_T$ comes into operation to short-circuit between the emitter and the base of the transistor $T_{r1}$ and stops the oscillating action to prevent the overcharging of the battery B. In other words, the third embodiment is designed so that when the battery voltage during the final charging period is detected to stop the blocking oscillations on the primary side and prevent the overcharging of the battery B, the primary side of the system is electrically insulated and separated from the secondary side of the system.

The operation of this third embodiment will be described briefly with reference to FIG. 3. During the initial charging period when the voltage on the battery B is low, the voltage switch is off and the light emitting element $L_a$ is also off. Thus, the transistor $T_{r1}$ is the normal operating condition providing a continuous flow of charging current. As the charging progresses so that the voltage on battery B eventually reaches the overcharge voltage, the voltage switch is turned on the operate the light emitting element $L_a$. Since the operation of the light emitting element $L_a$ causes the photoelectric conversion element $P_T$ to stop the oscillating action of the circuit $T_{r1}$, the charging of the battery B is stopped. In this condition, the voltage on the battery B decreases until it reaches the turn-off voltage of the voltage switch at which the light emitting element $L_a$ is cut out of operation to cause the circuit $T_{r1}$ to oscillate again and restart a flow of charging current. Thereafter, as previously mentioned in connection with the description of the embodiments shown in FIGS. 1 and 2, a pulse-like charging current flows and its mean charging current decreases gradually with the charging time to a safe value which has no danger of overcharging the battery B.

It will be seen that since on-off control is effected on the oscillating action of the oscillatory circuit in accordance with the presence of a light signal from the photo coupler, the insulation between the primary and secondary sides of the system is positively ensured and the use of the photo coupler ensures an improved photoelectric conversion efficiency without any loss. Moreover, the size and weight of the system are reduced by the use of the power supply comprising a DC-DC converter composed of a high-frequency blocking oscillator circuit.

Figure 5:
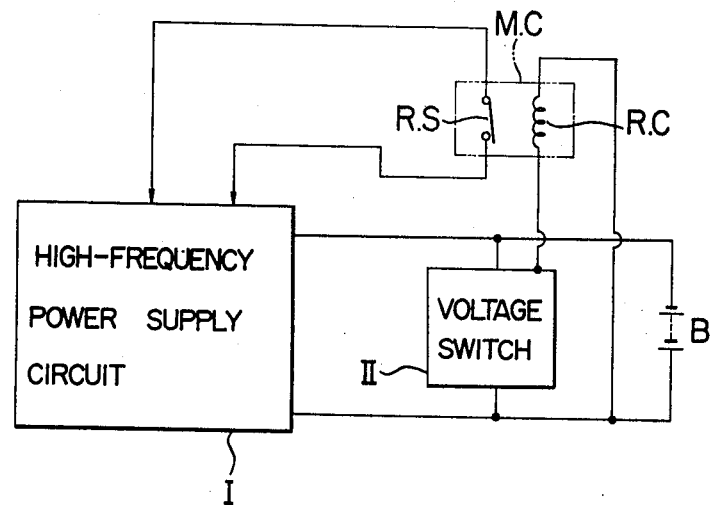
FIG. 5 is a circuit diagram of the charging system according to still another embodiment of this invention in which a magnet coupler is employed in place of the photo coupler used in the embodiment of FIG. 4.
Figure 6:
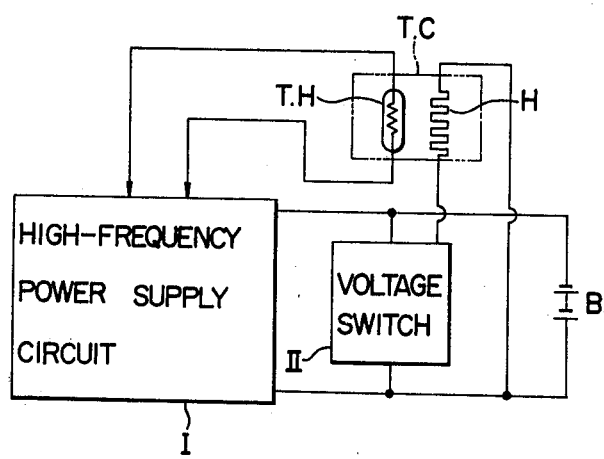
FIG. 6 is a circuit diagram of the charging system according to still another embodiment of this invention in which a thermal coupler is employed in place of the photo coupler in the embodiment of FIG. 4.

Further, in the charging system according to the embodiment of FIG. 4, the photo coupler may be replaced with a magnet coupler as shown in FIG. 5 or with a thermal coupler as shown in FIG. 6 to effect the on-off control of the oscillation of the oscillatory circuit.

In the embodiment shown in FIG. 5, a magnet coupler MC comprises, in combination, a relay coil RC and relay contacts RS which are opened and closed in accordance with the energization and deenergization of the relay coil RC. The blocks designated as I and II respectively show the high-frequency power supply circuit and the voltage switch which are identical with those of the previously described embodiments.

In the embodiment of FIG. 6, the on-off control of the oscillation in the oscillatory circuit is effected by a thermal coupler TC comprising, in combination, a heater H and a thermistor TH whose resistance value varies in accordance with the heat generation of the heater H. The blocks I and II are identical with those of the embodiment of FIG. 5.

Figure 7:
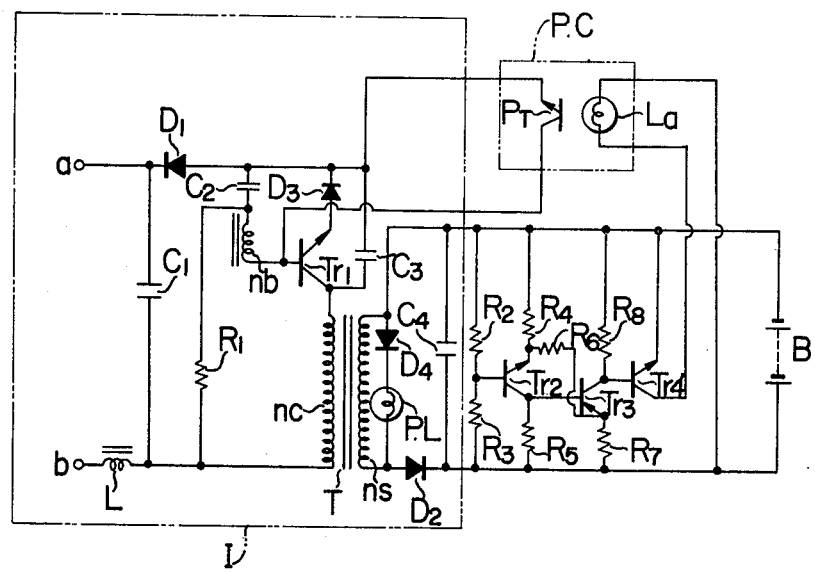
FIG. 7 is a circuit diagram of the charging system according to still another embodiment of this invention which includes a charge indicator.

In FIG. 7, there is illustrated still another embodiment of this invention which is a modification of the embodiment shown in FIG. 4.

In the embodiment shown in FIG. 7, the charging system is designed to provide an improved voltage proof and protection of the primary side circuit transistor and an improved operation for stopping the oscillation thereof, and it is further provided with a charge indicating circuit which permits confirmation of the state of charge of the battery. The embodiment of FIG. 7 differs from the embodiment of FIG. 4 in that in the charging power supply circuit I comprising a DC-DC converter enclosed by a dotted line, a diode $D_3$ is connected in series with the emitter of the transistor $T_{r1}$, a capacitor $C_3$ is provided between the cathode of the diode $D_3$ and the collector of the transistor $T_{r1}$ and a smoothing capacitor $C_4$ is connected across the secondary side output of the DC-DC converter. On the other hand, a series circuit comprising an indicating lamp PL and a diode $D_4$ is connected across the secondary winding $ns$ of the transfomrer T in a direction which causes a flow of current of opposite phase relative to the charging current that flows through the diode $D_2$.

In the charging system according to this embodiment, the diode $D_3$ is arranged so that when the photoelectric conversion element $P_T$ (photo transistor) incorporated in the photo coupler PC is operated upon receipt of a light signal from the light emitting element $L_a$, the transistor $T_{r1}$ is fully turned off to completely stop the charging process when the battery is in the overcharge state.

On the other hand, the capacitor $C_3$ is inserted to provide an improved voltage proof and protection so that a spike voltage produced during the oscillating period of the transistor $T_{r1}$ is prevented from becoming as high as two or three times the power supply voltage applied to the DC-DC converter and applied between the collector and the emitter of the transistor $T_{r1}$ to break it down.

The purpose of the indicating lamp PL connected across the secondary winding $ns$ of the transformer T is to serve as an indicator which is turned on when the system is charging the battery and which is turned off when the charging current is cut off. The battery B is charged during the positive half cycles of the charging current rectified by the diode $D_2$, and the indicating circuit is operated during the negative half cycles of the charging current to eliminate waste of the charging current.

It will thus be seen that since the charging system according to this embodiment is designed to provide an improved voltage proof and protection as well as the positive termination of the oscillating action of the circuit transistor $T_{r1}$ and to operate the charge indicating circuit during the negative half cycles of the charging current which are not directly concerned with the charging of the battery B, the state of charge of the battery B can be indicated without any deterioration of the charging efficiency. After the battery B has been fully charged, the charge indicator lamp $L_a$ is turned off or it flashes.

Figure 8:
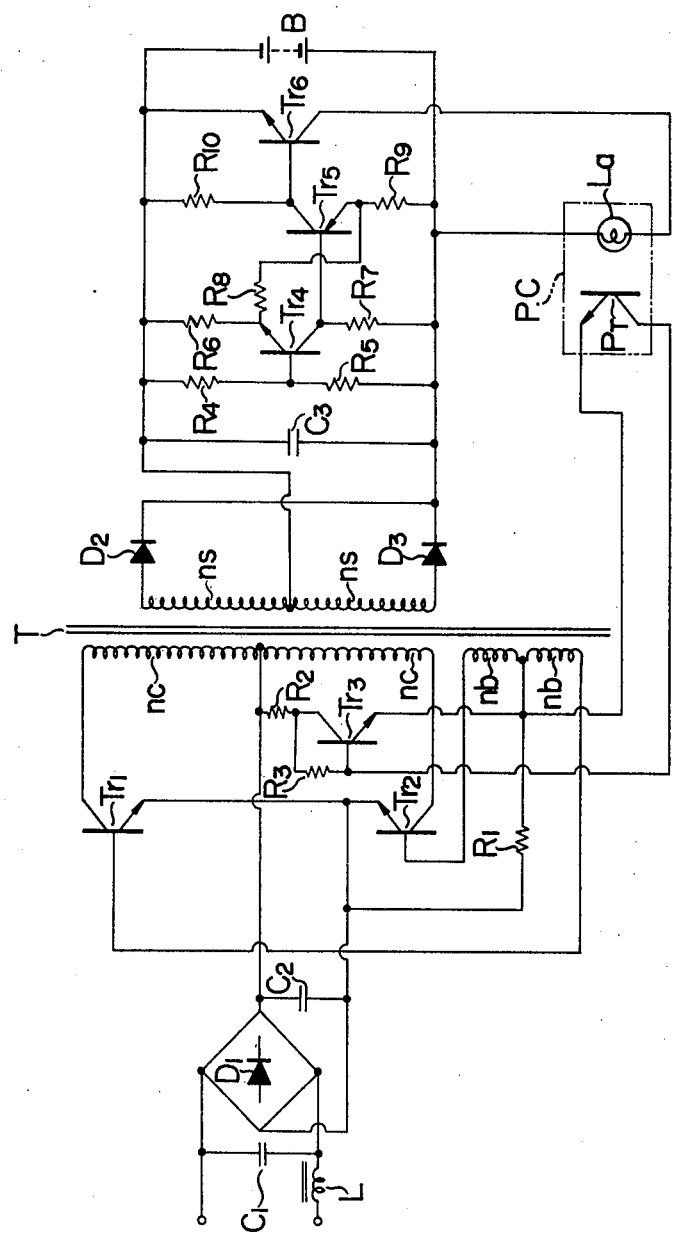
FIG. 8 is a circuit diagram of the charging system according to still another embodiment of this invention employing a dual converter.

While, in the embodiments of this invention so far described, the charging system is of the single-transistor DC-DC converter type, the embodiment shown in FIG. 8 shows a charging arrangement employing a dual converter.

A feature of the charging system according to this embodiment is its control method for preventing the overcharging of a battery by a charging power supply which comprises a dual converter (of the push-pull blocking oscillator type) having a larger current capacity than those of the previously described embodiments. In operation, an overcharge voltage of a battery is detected so that on-off control of the primary current of a step-down transformer is directed by a photo coupler. In FIG. 8, an inductance L and capacitor $C_1$ constitute a noise absorbing circuit for the commercial AC power supply. Symbols $D_1$, $D_2$ and $D_3$ designate rectifier diodes, $C_2$ and $C_3$ smoothing capacitors, $T_{r1}$ and $T_{r2}$ circuit transistors of NPN transistors consituting a transformer-coupled common-emitter oscillator circuit whose junction point is connected to the negative side of the diode $D_1$ and the collectors are connected to a collector winding $nc$ of a transformer T. The midpoint of the transformer collector winding $ns$ is connected to the positive side of the diode $D_1$. The bases of the transistors $T_{r1}$ and $T_{r1}$ are connected to a base winding $nb$ of the transformer T whose midpoint is connected to the negative side of the diode $D_1$ through a resistor $R_1$. $T_{r3}$ is a NPN transistor whose emitter is connected to the midpoint of the transformer base winding $nb$ and collector is connected to the positive side of the diode $D_1$ through a resistor $R_2$. A resistor $R_3$ is connected to the base and the collector of the transistor $T_{r3}$ for self-biasing purposes. The secondary side of the transformer T is arranged so that the charging current for a secondary battery B is supplied thereto through a full-wave rectifier circuit for a transformer center tap. The circuit comprising resistors $R_4$ through $R_{10}$, NPN transistors $T_{r4}$ and $T_{r6}$, a PNP transistor $T_{r5}$ and a light emitting element $L_a$ is a voltage switch which detects an overcharge voltage of the battery B to operate the light emitting element $L_a$ when the detected voltage reaches a predetermined level. The construction of this voltage switch will not be described further since it is identical with the one used in the previously described embodiments. In a photo coupler PC, a photo transistor $P_T$ has its emitter connected to the emitter of the transistor $T_{r3}$ and its collector connected to the base of the transistor $T_{r3}$.

In this embodiment, the charging power supply is constructed so that the commercial AC power is rectified and it is then lowered and rectified by the transformer in the dual converter for charging the battery B. And to reduce the size and weight as well as the costs of the power supply, the control of current for preventing overcharging of the battery B is accomplished through the on-off control of the current flowing in the primary oscillating coil or the base winding $nb$. In this case, the control signal is supplied from the above-mentioned voltage switch connected across the battery B. In other words, when the overcharge voltage of the battery B is detected by the voltage switch, the light emitting element $L_a$ comes into operation and applies a light signal to the photo transistor $P_T$ which turns off the transistor $T_{r3}$ and terminates the oscillation of the dual converter. Consequently, no voltage is induced in the transformer secondary winding $ns$ and the flow of the charging current is interrupted, thereby preventing the overcharging of the battery B. In the voltage switch for generating a light signal when the battery B is in an overcharge state, the operating point of the transistor $T_{r4}$ is determined in accordance with the dividing ratios of the resistors $R_4$ and $R_5$ and therefore it is necessary to select the dividing ratios of the resistors $R_4$ and $R_5$ so that the transistors $T_{r4}$, $T_{r5}$ and $T_{r6}$ are turned on at a point where the battery B is overcharged. When the voltage switch is on, the light emitting element $L_a$ is operated and hence the photo transistor $P_T$ is also turned on with the result that the transistor $T_{r3}$ is turned off to stop the signal current that flows to the bases of the transistors $T_{r1}$ and $T_{r2}$ through the transformer base winding $nb$ and thereby to stop the oscillation of the dual converter. Thus, the charging system according to this embodiment has the advantages of reduced size and weight of the charging power supply, improved electrical separation between the primary and secondary sides of the system and so on. It is of course possible to make many changes and modifications to the embodiment of FIG. 8. For example, as described in connection with the embodiment of FIG. 7, a diode may be connected to the emitter of the transistor $T_{r3}$ to ensure complete turning off thereof. The charging characteristics of this embodiment is the same as shown in FIG. 3.

Figure 9:
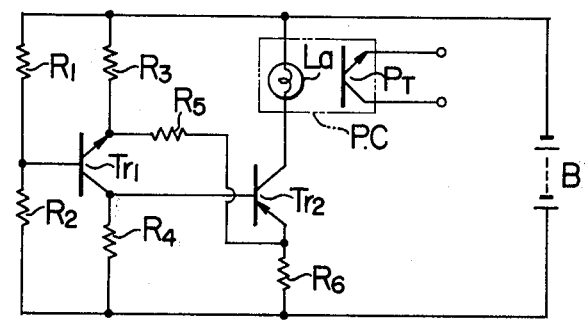
FIG. 9 is a circuit diagram showing a modified form of the voltage switch used in the charging system of this invention.

In FIG. 9, there is illustrated a modification of the voltage switch for detecting battery overcharge voltage which is a two-transistor type voltage switch. In FIG. 9, symbols $R_1$ and $R_2$ designate voltage dividing resistors connected in parallel with the battery B, $T_{r1}$ an NPN transistor whose base is connected to the midpoint of the voltage dividing resistors $R_1$ and $R_2$, emitter is connected to the negative terminal of the battery B through a resistor $R_3$ and collector is connected to the positive terminal of the battery B through a resistor $R_4$ and to the base of a PNP transistor $T_{r2}$. The emitter of the transistor $T_{r2}$ is connected to the emitter of the transistor $T_{r1}$ through a resistor $R_5$ and to the positive terminal of the Battery B through a resistor $R_6$. A light emitting element $L_a$ is connected between the collector of the transistor $T_{r2}$ and the negative side of the battery B and a photo transistor $P_T$ is operatively associated with the light emitting element $L_a$ to constitute a photo coupler. This modification is intended to reduce the manufacturing costs of the voltage switch and the basic operation of this modification is the same as that of the voltage switch used in the previously described embodiments. That is, when the transistor $T_{r1}$ is turned on, the transistor $T_{r2}$ is turned on to operate the light emitting element $L_a$. On the other hand, when the transistor $T_{r1}$ is turned off, the transistor $T_{r2}$ is turned off to deenergize the light emitting element $L_a$. The on and off operations of the transistor $T_{r1}$ are effected in accordance with its base-emitter voltage $V_{BE}$ as a reference voltage to switch it on and off. The operating voltage is determined by the dividing ratios of the resistors $R_1$ and $R_2$ and therefore it is necessary to select the dividing ratios of the resistors $R_1$ and $R_2$ so that the transistor $T_{r1}$ is turned on when the battery B is charged to the overcharge voltage. Consequently, a charging system employing this modified two-transistor type voltage switch is as effective as one employing the previously described three-transistor type voltage switch.

While the invention has been described and illustrated as embodied in a charging system employing a high-frequency type converter, the advantages of the charging system of this invention are summarized as follows:

1. Due to the use of a novel arrangement in which the voltage on a secondary battery on the secondary side of the system is detected and the charging current is controlled on the primary side, there is no need to use a large current capacity control element with resultant reduction in the size and manufacturing costs of the system.

2. Due to the use of a higher-frequency power supply, the size and weight of the transformer are reduced.

3. Due to the use of a photo coupler as a control element, the primary and secondary sides of the system are electrically insulated and separated from each other.

4. Due to a novel arrangement of the charge indicating circuit in which the lamp current is supplied during the half cycles of the charging current not directly concerned with charging of the battery, the state of charge of the battery can be indicated without deteriorating the charging efficiency and thus permitting effective utilization of the power.

5. Due to the provision of a capacitor between the emitter and the collector of a circuit transistor, an improved voltage proof and protection are ensured for the circuit transistor with the result that a transistor having substantially a lower breakdown voltage can be used with resultant reduction in the manufacturing costs of the system.

What we claim is:

1. A system for charging a storage battery comprising:
   a. a high-frequency power supply circuit including a DC-DC converter, said DC-DC converter comprising an oscillator circuit having an output transistor, a transformer having its primary winding connected to the output of said output transistor, and a rectifier, said circuit supplying pulse current from the secondary winding of said transformer to said storage battery through said rectifier;
   b. a voltage switching circuit for detecting the voltage across said storage battery comprising a plurality of voltage dividing resistors connected across said storage battery; a first transistor having its base connected to a junction between two of said plurality of voltage dividing resistors; first resistor means coupling the emitter and collector of said first transistor across said storage battery; a second transistor having its base connected to the collector of said first transistor, said second transistor being of the opposite conduction type from said first transistor; second resistor means coupling the emitter and collector of said second transistor across said storage battery; a resistor coupled between the emitters of said first and second transistors; and at least one amplifying transistor for amplifying the output of said second transistor, said voltage switching circuit detecting the voltage across said storage battery and being switched from its OFF state to its ON state when the voltage across said storage battery rises to a preset value; and
   c. a feedback circuit coupling the last stage amplifying transistor of said voltage switching circuit across the base and emitter of said output transistor, said feedback circuit causing said high-frequency power supply circuit to stop oscillating in response to the turn-on of said voltage switching circuit.

2. A charging system according to claim 1, wherein a pilot lamp and a rectifier are connected in series across the secondary winding of said transformer, said rectifier being rendered conductive in a phase opposite to that of the charging current.

* * * * *